No. 647,877. Patented Apr. 17, 1900.
S. M. REDFIELD.
CREAM SEPARATOR.
(Application filed Jan. 9, 1900.)
(No Model.)
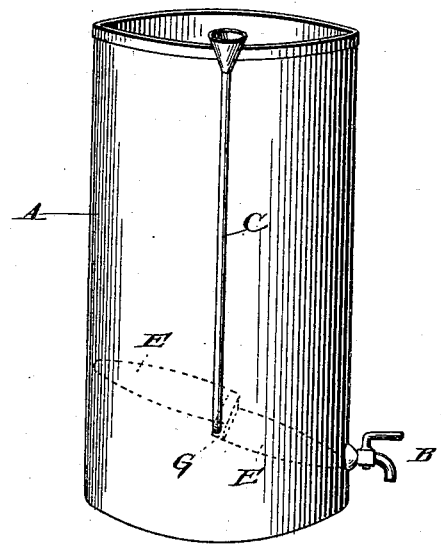
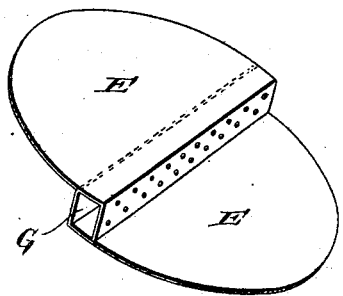
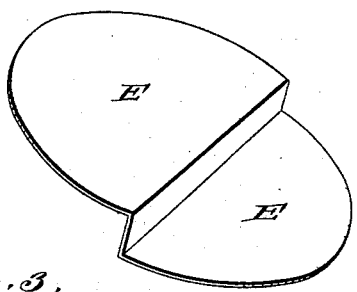
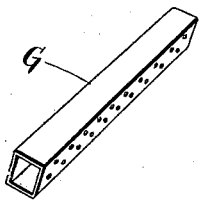
Witnesses:
Ira R. Alderman
O. H. Smith
Inventor:
Stephen M. Redfield

UNITED STATES PATENT OFFICE.

STEPHEN M. REDFIELD, OF MARYVILLE, MISSOURI.

CREAM-SEPARATOR.

SPECIFICATION forming part of Letters Patent No. 647,877, dated April 17, 1900.

Application filed January 9, 1900. Serial No. 907. (No model.)

*To all whom it may concern:*

Be it known that I, STEPHEN M. REDFIELD, a citizen of the United States, residing in Maryville, Nodaway county, Missouri, have invented a new and useful Improvement in Cream-Separators, of which the following is a specification, reference being had to the attached and accompanying drawings, forming part hereof.
Figure 1 is a view of a common or ordinary milk-can as it will appear with my invention attached. Figs. 2, 3, and 4 represent a separate view of the inside bottom of the cream-separator as invented and prepared for placing in bottom of milk-can when constructed as shown.

A shows an ordinary milk-can, constructed of tin or other material, for containing the milk from which cream is to be separated.
B is a faucet attached at a point on the side of milk-can and near the bottom, as shown by dotted line E E, to draw contents of separator, which dotted line represents the position of the inside bottom when placed in permanent position.

C represents a tube one-half inch in size, more or less, with funnel-shaped top, as shown, attached at its lower end on the outside of milk-can to a tube G one-half inch square, more or less, formed by a peculiar construction and formation of the inside bottom, as explained in Figs. 2, 3, and 4, through which tubes cold water may be conducted into the bottom of the separator containing milk from which the cream is to be separated, as explained.

The inside bottom of the separator is constructed in two sections, as shown at E E, Fig. 2, and so united by solder as to form a hollow or tube G one-half of an inch square, more or less, extending through the sloping bottom E E, Fig. 1, and as shown, thus: The upper section of inside bottom of separator is a continuous bottom extending from upper edge of bottom slope to where it is united by a downward right-angle turn or folding to the lower section, which extends continuously from lower edge of sloping bottom to where it is united by an upward right-angle turn or folding to the under side of upper section, so as to form a square tube G one-half of an inch square, more or less, through and being a part of the inside bottom of cream-separator, constructed so as to receive the lower end of tube C, Fig. 1, secured thereto by solder or other convenient device, the lower and down folding part of upper section to be perforated, as shown, so that cold water supplied through funnel and tube C, Fig. 1, will be conducted to tube G and pass through said perforated part downward into bottom of separator and into bottom of milk contained therein, the size of tube and perforation, as shown, to be of such dimension as will be self-regulating of the speed with which water shall be admitted with least commotion and disturbance to contents of separator, thus acting automatically, the cold water having its momentum directed downward and toward the lowest point in the separator rather than upward, or inside bottom may be constructed in separate parts, as shown in Figs. 3 and 4, Fig. 3 representing tube G, detached from Fig. 4 for convenience in cleansing, which may be replaced at will in offset in bottom, as shown in Fig. 4, and when so replaced giving the same appearance as shown in Fig. 2 and operative in identically the same manner as described.

What I claim as new is—

A cream-separator consisting of the body A, having an inclined and stepped bottom E, a transverse chamber G beneath the step, said chamber being provided with perforations opening through the side thereof into the body, and a tube C having its lower end communicating with the interior of the chamber, substantially as described.

STEPHEN M. REDFIELD.

Witnesses:
IRA K. ALDERMAN,
C. P. DENNY.